(12) United States Patent
Bankoski et al.

(10) Patent No.: US 9,131,073 B1
(45) Date of Patent: Sep. 8, 2015

(54) MOTION ESTIMATION AIDED NOISE REDUCTION

(75) Inventors: James Bankoski, Los Gatos, CA (US); Stefan Holmer, Stockholm (SE)

(73) Assignee: GOOGLE INC., Mountain View, CA (US)

( * ) Notice: Subject to any disclaimer, the term of this patent is extended or adjusted under 35 U.S.C. 154(b) by 734 days.

(21) Appl. No.: 13/410,942

(22) Filed: Mar. 2, 2012

(51) Int. Cl.
H04N 11/02 (2006.01)
H04N 7/00 (2011.01)
H04N 19/61 (2014.01)

(52) U.S. Cl.
CPC . *H04N 7/00* (2013.01); *H04N 19/61* (2013.01)

(58) Field of Classification Search
CPC ............ G06T 2207/10016; G06T 5/002; H04N 19/00781
See application file for complete search history.

(56) References Cited

U.S. PATENT DOCUMENTS

| | | | |
|---|---|---|---|
| 3,825,832 A | 7/1974 | Frei et al. | |
| 4,719,642 A | 1/1988 | Lucas | |
| 4,729,127 A | 3/1988 | Chan et al. | |
| 4,736,446 A | 4/1988 | Reynolds et al. | |
| 4,816,906 A | 3/1989 | Kummerfeldt et al. | |
| 4,868,764 A | 9/1989 | Richards | |
| 4,891,748 A | 1/1990 | Mann | |
| 4,924,310 A | 5/1990 | von Brandt | |
| 5,068,724 A | 11/1991 | Krause et al. | |
| 5,083,214 A | 1/1992 | Knowles | |
| 5,091,782 A | 2/1992 | Krause et al. | |
| 5,136,371 A | 8/1992 | Savatier et al. | |
| 5,136,376 A | 8/1992 | Yagasaki et al. | |
| 5,148,269 A | 9/1992 | de Haan et al. | |
| 5,164,819 A | 11/1992 | Music | |

(Continued)

FOREIGN PATENT DOCUMENTS

| | | |
|---|---|---|
| EP | 0634873 B1 | 9/1998 |
| EP | 1351510 | 10/2003 |

(Continued)

OTHER PUBLICATIONS

Mahmoudi, Mona et al.; "Fast Image and Video Denoising via Nonlocal Means of Similar Neighborhoods", IEEE Signal Processing Letters, vol. 12, No. 12, Dec. 2005.

(Continued)

*Primary Examiner* — Joseph Ustaris
*Assistant Examiner* — Zhubing Ren
(74) *Attorney, Agent, or Firm* — Young Basile Hanlon & MacFarlane P.C.

(57) ABSTRACT

A method and apparatus for performing motion estimation aided noise reduction encoding and decoding are provided. Motion estimation aided noise reduction encoding can include identifying a motion vector for encoding a current block in a video frame based on a reference block in a reference frame, identifying a noise reduction block for denoising the current block, aligning the noise reduction block with the current block, denoising the current block, identifying a motion vector for encoding the denoised block, generating a residual block for encoding the denoised block, and encoding the denoised block. Denoising the current block can include identifying a filter coefficient for a pixel in the current block based on a corresponding pixel in the noise reduction block, producing a denoised pixel based on the coefficient and the corresponding pixel, and determining whether to use the denoised pixel or the current pixel for encoding the block.

16 Claims, 8 Drawing Sheets

(56) References Cited

U.S. PATENT DOCUMENTS

| | | | |
|---|---|---|---|
| 5,270,812 A | 12/1993 | Richards | |
| 5,274,442 A | 12/1993 | Murakami et al. | |
| 5,278,647 A | 1/1994 | Hingorani et al. | |
| 5,313,306 A | 5/1994 | Kuban et al. | |
| 5,337,086 A | 8/1994 | Fujinami | |
| 5,341,440 A | 8/1994 | Earl et al. | |
| 5,361,105 A * | 11/1994 | Iu | 348/699 |
| 5,365,280 A | 11/1994 | De Haan et al. | |
| 5,377,018 A | 12/1994 | Rafferty | |
| 5,398,068 A | 3/1995 | Liu et al. | |
| 5,432,870 A | 7/1995 | Schwartz | |
| 5,457,780 A | 10/1995 | Shaw et al. | |
| 5,461,423 A | 10/1995 | Tsukagoshi | |
| 5,488,570 A | 1/1996 | Agarwal | |
| 5,512,952 A | 4/1996 | Iwamura | |
| 5,561,477 A | 10/1996 | Polit | |
| 5,568,200 A | 10/1996 | Pearlstein et al. | |
| 5,576,767 A | 11/1996 | Lee et al. | |
| 5,579,348 A | 11/1996 | Walker et al. | |
| 5,589,945 A | 12/1996 | Abecassis | |
| 5,623,308 A | 4/1997 | Civanlar et al. | |
| 5,629,736 A | 5/1997 | Haskell et al. | |
| 5,640,208 A | 6/1997 | Fujinami | |
| 5,659,539 A | 8/1997 | Porter et al. | |
| 5,686,962 A | 11/1997 | Chung et al. | |
| 5,689,306 A | 11/1997 | Jung | |
| 5,696,869 A | 12/1997 | Abecassis | |
| 5,717,791 A | 2/1998 | Labaere et al. | |
| 5,721,822 A | 2/1998 | Agarwal | |
| 5,731,840 A | 3/1998 | Kikuchi et al. | |
| 5,734,744 A | 3/1998 | Wittenstein et al. | |
| 5,737,020 A | 4/1998 | Hall et al. | |
| 5,748,242 A | 5/1998 | Podilchuk | |
| 5,748,247 A | 5/1998 | Hu | |
| 5,767,909 A | 6/1998 | Jung | |
| 5,774,593 A | 6/1998 | Zick et al. | |
| 5,793,647 A | 8/1998 | Hageniers et al. | |
| 5,812,197 A | 9/1998 | Chan et al. | |
| 5,818,536 A | 10/1998 | Morris et al. | |
| 5,818,969 A | 10/1998 | Astle | |
| 5,828,370 A | 10/1998 | Moeller et al. | |
| 5,886,742 A | 3/1999 | Hibi et al. | |
| 5,903,264 A | 5/1999 | Moeller et al. | |
| 5,912,676 A | 6/1999 | Malladi et al. | |
| 5,929,940 A | 7/1999 | Jeannin | |
| 5,930,493 A | 7/1999 | Ottesen et al. | |
| 5,946,414 A | 8/1999 | Cass et al. | |
| 5,959,672 A | 9/1999 | Sasaki | |
| 5,963,203 A | 10/1999 | Goldberg et al. | |
| 5,969,777 A | 10/1999 | Mawatari | |
| 5,985,526 A | 11/1999 | Tutt et al. | |
| 5,987,866 A | 11/1999 | Weeger et al. | |
| 5,991,447 A | 11/1999 | Eifrig et al. | |
| 5,999,641 A | 12/1999 | Miller et al. | |
| 6,005,980 A | 12/1999 | Eifrig et al. | |
| 6,014,706 A | 1/2000 | Cannon et al. | |
| 6,041,145 A | 3/2000 | Hayashi et al. | |
| 6,061,397 A | 5/2000 | Ogura | |
| 6,084,908 A | 7/2000 | Chiang et al. | |
| 6,097,842 A | 8/2000 | Suzuki et al. | |
| 6,100,940 A | 8/2000 | Dieterich | |
| 6,108,383 A | 8/2000 | Miller et al. | |
| 6,112,234 A | 8/2000 | Leiper | |
| 6,115,501 A | 9/2000 | Chun et al. | |
| 6,119,154 A | 9/2000 | Weaver et al. | |
| 6,125,144 A | 9/2000 | Matsumura et al. | |
| 6,141,381 A | 10/2000 | Sugiyama | |
| 6,167,164 A | 12/2000 | Lee | |
| 6,181,822 B1 | 1/2001 | Miller et al. | |
| 6,185,363 B1 | 2/2001 | Dimitrova et al. | |
| 6,188,799 B1 | 2/2001 | Tan et al. | |
| 6,233,279 B1 | 5/2001 | Boon | |
| 6,240,135 B1 | 5/2001 | Kim | |
| 6,272,179 B1 | 8/2001 | Kadono | |
| 6,277,075 B1 | 8/2001 | Torp et al. | |
| 6,285,801 B1 | 9/2001 | Mancuso et al. | |
| 6,289,049 B1 | 9/2001 | Kim et al. | |
| 6,292,837 B1 | 9/2001 | Miller et al. | |
| 6,327,304 B1 | 12/2001 | Miller et al. | |
| 6,359,929 B1 | 3/2002 | Boon | |
| 6,370,267 B1 | 4/2002 | Miller et al. | |
| 6,381,277 B1 | 4/2002 | Chun et al. | |
| 6,400,763 B1 | 6/2002 | Wee | |
| 6,414,995 B2 | 7/2002 | Okumura et al. | |
| 6,418,166 B1 | 7/2002 | Wu et al. | |
| 6,434,197 B1 | 8/2002 | Wang et al. | |
| 6,473,463 B2 | 10/2002 | Agarwal | |
| 6,522,784 B1 | 2/2003 | Zlotnick | |
| 6,529,638 B1 | 3/2003 | Westerman | |
| 6,535,555 B1 | 3/2003 | Bordes et al. | |
| 6,560,366 B1 | 5/2003 | Wilkins | |
| 6,621,867 B1 | 9/2003 | Sazzad et al. | |
| 6,661,842 B1 | 12/2003 | Abousleman | |
| 6,687,303 B1 | 2/2004 | Ishihara | |
| 6,694,342 B1 | 2/2004 | Mou | |
| 6,697,061 B1 | 2/2004 | Wee et al. | |
| 6,707,952 B1 | 3/2004 | Tan et al. | |
| 6,711,211 B1 | 3/2004 | Lainema | |
| 6,735,249 B1 | 5/2004 | Karczewicz et al. | |
| 6,765,964 B1 | 7/2004 | Conklin | |
| 6,798,837 B1 | 9/2004 | Uenoyama et al. | |
| 6,807,317 B2 | 10/2004 | Mathew et al. | |
| 6,826,229 B2 | 11/2004 | Kawashima et al. | |
| 6,904,091 B1 | 6/2005 | Schelkens et al. | |
| 6,904,096 B2 | 6/2005 | Kobayashi et al. | |
| 6,907,079 B2 | 6/2005 | Gomila et al. | |
| 6,934,419 B2 | 8/2005 | Zlotnick | |
| 6,985,526 B2 | 1/2006 | Bottreau et al. | |
| 6,985,527 B2 | 1/2006 | Gunter et al. | |
| 6,987,866 B2 | 1/2006 | Hu | |
| 7,027,654 B1 | 4/2006 | Ameres et al. | |
| 7,031,546 B2 | 4/2006 | Maeda et al. | |
| 7,054,367 B2 | 5/2006 | Oguz et al. | |
| 7,088,351 B2 | 8/2006 | Wang | |
| 7,116,831 B2 | 10/2006 | Mukerjee et al. | |
| 7,120,197 B2 | 10/2006 | Lin et al. | |
| 7,170,937 B2 | 1/2007 | Zhou | |
| 7,194,036 B1 | 3/2007 | Melanson | |
| 7,226,150 B2 | 6/2007 | Yoshimura et al. | |
| 7,236,524 B2 | 6/2007 | Sun et al. | |
| 7,277,592 B1 | 10/2007 | Lin | |
| 7,330,509 B2 | 2/2008 | Lu et al. | |
| 7,358,881 B2 | 4/2008 | Melanson | |
| 7,447,337 B2 | 11/2008 | Zhang et al. | |
| 7,492,823 B2 | 2/2009 | Lee et al. | |
| 7,499,492 B1 | 3/2009 | Ameres et al. | |
| 7,590,179 B2 | 9/2009 | Mukerjee | |
| 7,606,310 B1 | 10/2009 | Ameres et al. | |
| 7,620,103 B2 | 11/2009 | Cote et al. | |
| 7,627,040 B2 | 12/2009 | Woods et al. | |
| 7,657,098 B2 | 2/2010 | Lin et al. | |
| 7,751,514 B2 | 7/2010 | Tsuie et al. | |
| 7,885,476 B2 | 2/2011 | Zhang | |
| 7,916,783 B2 | 3/2011 | Gao et al. | |
| 8,045,813 B2 | 10/2011 | Lee et al. | |
| 8,121,196 B2 | 2/2012 | Katsavounidis et al. | |
| 8,200,028 B2 | 6/2012 | Gabso et al. | |
| 8,218,629 B2 | 7/2012 | Lee et al. | |
| 8,259,819 B2 | 9/2012 | Liu et al. | |
| 8,295,367 B2 | 10/2012 | Tang et al. | |
| 8,325,805 B2 | 12/2012 | Cho et al. | |
| 8,780,971 B1 | 7/2014 | Bankoski et al. | |
| 8,885,706 B2 | 11/2014 | Bankoski et al. | |
| 2001/0022815 A1 | 9/2001 | Agarwal | |
| 2002/0031272 A1 | 3/2002 | Bagni et al. | |
| 2002/0036705 A1 | 3/2002 | Lee et al. | |
| 2002/0064228 A1 | 5/2002 | Sethuraman et al. | |
| 2002/0094130 A1 | 7/2002 | Bruls et al. | |
| 2002/0168114 A1 | 11/2002 | Valente | |
| 2002/0172431 A1 | 11/2002 | Atkins et al. | |
| 2003/0023982 A1 | 1/2003 | Lee et al. | |
| 2003/0039310 A1 * | 2/2003 | Wu et al. | 375/240.16 |
| 2003/0053708 A1 | 3/2003 | Kryukov et al. | |
| 2003/0053711 A1 | 3/2003 | Kim | |

(56) References Cited

U.S. PATENT DOCUMENTS

| | | |
|---|---|---|
| 2003/0081850 A1 | 5/2003 | Karczewicz et al. |
| 2003/0142753 A1 | 7/2003 | Gunday |
| 2003/0165331 A1 | 9/2003 | Van Der Schaar |
| 2003/0189982 A1 | 10/2003 | MacInnis |
| 2003/0194009 A1 | 10/2003 | Srinivasan |
| 2003/0215014 A1 | 11/2003 | Koto et al. |
| 2004/0013308 A1 | 1/2004 | Jeon et al. |
| 2004/0017939 A1 | 1/2004 | Mehrotra |
| 2004/0042549 A1 | 3/2004 | Huang et al. |
| 2004/0047416 A1 | 3/2004 | Tomita |
| 2004/0062307 A1 | 4/2004 | Hallapuro et al. |
| 2004/0080669 A1 | 4/2004 | Nagai et al. |
| 2004/0120400 A1 | 6/2004 | Linzer |
| 2004/0179610 A1 | 9/2004 | Lu et al. |
| 2004/0181564 A1 | 9/2004 | MacInnis et al. |
| 2004/0184533 A1 | 9/2004 | Wang |
| 2004/0228410 A1 | 11/2004 | Ameres et al. |
| 2004/0240556 A1 | 12/2004 | Winger et al. |
| 2005/0013358 A1 | 1/2005 | Song et al. |
| 2005/0013494 A1 | 1/2005 | Srinivasan et al. |
| 2005/0053294 A1 | 3/2005 | Mukerjee et al. |
| 2005/0117653 A1 | 6/2005 | Sankaran |
| 2005/0135699 A1 | 6/2005 | Anderson |
| 2005/0147165 A1 | 7/2005 | Yoo et al. |
| 2005/0169374 A1 | 8/2005 | Marpe et al. |
| 2005/0196063 A1 | 9/2005 | Guangxi et al. |
| 2005/0265447 A1 | 12/2005 | Park |
| 2005/0276323 A1 | 12/2005 | Martemyanov et al. |
| 2005/0276327 A1 | 12/2005 | Lee et al. |
| 2005/0286629 A1 | 12/2005 | Dumitras et al. |
| 2006/0013315 A1 | 1/2006 | Song |
| 2006/0062311 A1 | 3/2006 | Sun et al. |
| 2006/0093038 A1 | 5/2006 | Boyce |
| 2006/0098737 A1 | 5/2006 | Sethuraman et al. |
| 2006/0098738 A1 | 5/2006 | Cosman et al. |
| 2006/0126962 A1 | 6/2006 | Sun |
| 2006/0153301 A1 | 7/2006 | Guleryuz |
| 2006/0182181 A1 | 8/2006 | Lee et al. |
| 2006/0215758 A1 | 9/2006 | Kawashima |
| 2006/0239345 A1 | 10/2006 | Taubman et al. |
| 2006/0268990 A1 | 11/2006 | Lin et al. |
| 2007/0009044 A1 | 1/2007 | Tourapis et al. |
| 2007/0009171 A1 | 1/2007 | Nakashizuka et al. |
| 2007/0025448 A1 | 2/2007 | Cha et al. |
| 2007/0047648 A1 | 3/2007 | Tourapis et al. |
| 2007/0081593 A1 | 4/2007 | Jeong et al. |
| 2007/0098067 A1 | 5/2007 | Kim et al. |
| 2007/0110152 A1 | 5/2007 | Lee et al. |
| 2007/0140338 A1 | 6/2007 | Bhaskaran et al. |
| 2007/0140342 A1 | 6/2007 | Karczewicz et al. |
| 2007/0153899 A1 | 7/2007 | Koto et al. |
| 2007/0171988 A1 | 7/2007 | Panda et al. |
| 2007/0177673 A1 | 8/2007 | Yang |
| 2007/0189735 A1 | 8/2007 | Kawashima et al. |
| 2007/0201559 A1 | 8/2007 | He |
| 2007/0230572 A1 | 10/2007 | Koto et al. |
| 2007/0237241 A1 | 10/2007 | Ha et al. |
| 2007/0253483 A1 | 11/2007 | Lee et al. |
| 2007/0253490 A1 | 11/2007 | Makino |
| 2007/0253491 A1 | 11/2007 | Ito et al. |
| 2007/0274385 A1 | 11/2007 | He |
| 2007/0274388 A1 | 11/2007 | Lee et al. |
| 2008/0025398 A1 | 1/2008 | Molloy et al. |
| 2008/0025411 A1 | 1/2008 | Chen et al. |
| 2008/0080615 A1 | 4/2008 | Tourapis et al. |
| 2008/0101469 A1 | 5/2008 | Ishtiaq et al. |
| 2008/0130755 A1 | 6/2008 | Loukas et al. |
| 2008/0159649 A1 | 7/2008 | Kempf et al. |
| 2008/0170629 A1 | 7/2008 | Shim et al. |
| 2008/0198931 A1 | 8/2008 | Chappalli et al. |
| 2008/0212678 A1 | 9/2008 | Booth et al. |
| 2008/0219351 A1 | 9/2008 | Kim et al. |
| 2008/0253457 A1 | 10/2008 | Moore |
| 2008/0279279 A1 | 11/2008 | Liu et al. |
| 2008/0298472 A1 | 12/2008 | Jain et al. |
| 2009/0003440 A1 | 1/2009 | Karczewicz et al. |
| 2009/0003717 A1 | 1/2009 | Sekiguchi et al. |
| 2009/0034617 A1 | 2/2009 | Tanaka |
| 2009/0161770 A1 | 6/2009 | Dong et al. |
| 2009/0185058 A1 | 7/2009 | Vakrat et al. |
| 2009/0190660 A1* | 7/2009 | Kusakabe et al. ........ 375/240.13 |
| 2009/0196351 A1 | 8/2009 | Cho et al. |
| 2009/0287493 A1 | 11/2009 | Janssen et al. |
| 2009/0316793 A1 | 12/2009 | Yang et al. |
| 2010/0022815 A1 | 1/2010 | Chikamatsu et al. |
| 2010/0027906 A1 | 2/2010 | Hara et al. |
| 2010/0208944 A1 | 8/2010 | Fukunishi |
| 2011/0007799 A1 | 1/2011 | Karczewicz et al. |
| 2011/0116549 A1 | 5/2011 | Sun |
| 2011/0141237 A1 | 6/2011 | Cheng et al. |
| 2011/0228843 A1 | 9/2011 | Narroschke et al. |
| 2011/0229029 A1 | 9/2011 | Kass |
| 2011/0268182 A1 | 11/2011 | Joshi |
| 2012/0008870 A1 | 1/2012 | Nguyen et al. |
| 2012/0039383 A1 | 2/2012 | Huang et al. |
| 2012/0063513 A1 | 3/2012 | Grange et al. |
| 2012/0081566 A1 | 4/2012 | Cote et al. |
| 2012/0081580 A1 | 4/2012 | Cote et al. |
| 2012/0082580 A1 | 4/2012 | Tsuboi et al. |
| 2013/0114679 A1 | 5/2013 | Wilkins et al. |

FOREIGN PATENT DOCUMENTS

| | | |
|---|---|---|
| EP | 1365590 | 11/2003 |
| EP | 1511319 | 3/2005 |
| EP | 1555832 | 7/2005 |
| EP | 1564997 | 8/2005 |
| EP | 1838108 | 9/2007 |
| EP | 1840875 | 10/2007 |
| EP | 2076045 | 7/2009 |
| JP | 61092073 | 5/1986 |
| JP | 2217088 | 8/1990 |
| JP | 06038197 | 2/1994 |
| JP | 8280032 | 10/1996 |
| JP | 09179987 | 7/1997 |
| JP | 11262018 | 9/1999 |
| JP | 11289544 | 10/1999 |
| JP | 11313332 | 11/1999 |
| JP | 11513205 | 11/1999 |
| JP | 2005503737 | 2/2005 |
| JP | 2005308623 | 11/2005 |
| KR | 100213018 | 8/1999 |
| KR | 200130916 | 4/2001 |
| WO | WO0150770 | 7/2001 |
| WO | WO02089487 | 11/2002 |
| WO | WO03026315 | 3/2003 |
| WO | WO2006602377 | 6/2006 |
| WO | WO2006083614 | 8/2006 |
| WO | WO2007052303 | 5/2007 |
| WO | WO2008005124 | 1/2008 |
| WO | WO2010077325 | 7/2010 |
| WO | WO2012123855 | 9/2012 |

OTHER PUBLICATIONS

"Recent Trends in Denoising Tutorial: Selected Publications"; 2007 IEEE International Symposium on Information Theory (ISIT2007). http://www.stanford.edu/~slansel/tutorial/publications.htm. Feb. 2012.

"Video denoising" http://en.wikipedia.org/wiki/Video_denoising.com. Feb. 2012.

Nokia, Inc., Nokia Research Center, "MVC Decoder Description", Telecommunication Standardization Sector, Study Period 1997-2000, Geneva, Feb. 7, 2000, 99 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Chen, Xing C., et al.; "Quadtree Based Adaptive Lossy Coding of Motion Vectors", IEEE 1996, 4 pp.

Wright, R. Glenn, et al.; "Multimedia—Electronic Technical Manual for ATE", IEEE 1996, 3 pp.

(56) References Cited

OTHER PUBLICATIONS

Schiller, H., et al.; "Efficient Coding of Side Information in a Low Bitrate Hybrid Image Coder", Signal Processing 19 (1990) Elsevier Science Publishers B.V. 61-73, 13 pp.

Strobach, Peter; "Tree-Structured Scene Adaptive Coder", IEEE Transactions on Communications, vol. 38, No. 4, Apr. 1990, 10 pp.

Steliaros, Michael K., et al.; "Locally-accurate motion estimation for object-based video coding", SPIE vol. 3309, 1997, 11 pp.

Martin, Graham R., et al.; "Reduced Entropy Motion Compensation Using Variable Sized Blocks", SPIE vol. 3024, 1997, 10 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Guillotel, Philippe, et al.; "Comparison of motion vector coding techniques", SPIE vol. 2308, 1994, 11 pp.

Orchard, Michael T.; "Exploiting Scene Structure in Video Coding", IEEE 1991, 5 pp.

Liu, Bede, et al.; "A simple method to segment motion field for video coding", SPIE vol. 1818, Visual Communications and Image Processing 1992, 10 pp.

Ebrahimi, Touradj, et al.; "Joint motion estimation and segmentation for very low bitrate video coding", SPIE vol. 2501, 1995, 12 pp.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wiegand, Thomas, et al.; "Long-Term Memory Motion-Compensated Prediction", Publication Unknown, Date Unknown, 15 pp.

Zhang, Kui, et al.; "Variable Block Size Video Coding With Motion Prediction and Motion Segmentation", SPIE vol. 2419, 1995, 9 pp.

Chen, Michael C., et al.; "Design and Optimization of a Differentially Coded Variable Block Size Motion Compensation System", IEEE 1996, 4 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Nicolas, H., et al.; "Region-based motion estimation using deterministic relaxation schemes for image sequence coding", IEEE 1992, 4 pp.

Luttrell, Max, et al.; "Simulation Results for Modified Error Resilient Syntax With Data Partitioning and RVLC", ITU-Telecommunications Standardization Sector, Study Group 16, Video Coding Experts Group (Question 15), Sixth Meeting: Seoul, South Korea, Nov. 2, 1998, 34 pp.

A High Efficient Method for Parallelizing Reconstructor & Loop Deblocking Filter on Multi-core Processor Platform.

An Optimized In-Loop H.264 De-Blocking Filter on Multi-Core Engines.

Architectures for Efficient Partitioning of Video Coding Algorithms—H. 264 decoder.

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Dai, JingJing et al., "Film Grain Noise Removal and Synthesis in Video Coding", 2010 IEEE, pp. 890-893.

Hsiand, Anatialiasing Spatial Scalable Subband/Wavelet Coding Using H.264/AVC, 4 pages.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

International Telecommunications Union, ITU-T, Telecommunication Standardization Section of ITU, "Series H: Audiovisual and Multimedia Systems, Infrastructure of audiovisual services—Coding of moving video", Mar. 2010, 676 pp.

Lee, Yung-Lyul; Park, Hyun Wook; "Loop Filtering and Post-Filtering for Low-Bit-Rates Moving Picture Coding", Signal Processing: Image Communication 16 (2001) pp. 871-890.

Lihua Zhu, Guangfei Zhu, Charles Wang; Implementation of video deblocking filter on GPU Apr. 8, 2008.

Method for unloading YUV-filtered pixels from a deblocking filter for a video decoder, Oct. 11, 2006.

Mohammed Aree A., et al., "Adaptive Quantization for Video Compression in Frequency Domain", Retrieved from the internet <URL http://www.univsul.org/Dosekan_Mamostakan_U/acs15.pdf>.

Mozilla, "Introduction to Video Coding Part 1: Transform Coding", Video Compression Overview, Mar. 2012, 171 pp.

ON2 Technologies Inc., White Paper TrueMotion VP7 Video Codec, Jan. 10, 2005, 13 pages, Document Version:1.0, Clifton Park, New York.

Overview; VP7 Data Format and Decoder. Version 1.5. On2 Technologies, Inc. Dated Mar. 28, 2005.

Raza, Zahir, "Design of Sample Adaptive Product Quantizers for Noisy Channels", IEEE Transactions on Communications, vol. 53, No. 4, Apr. 2005, pp. 576-580.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual service. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

Sye-Hoon Oh, et al. "An Adaptive Sharpening Filter Using Quantization Step Size and Pixel Variance in H.264/AVC", Consumer Electronics (ICCE), IEEE International Conference on Jan. 9, 2011.

Tan et al., "Classified Perceptual Caoding with Adaptive Quantization," IEEE Transactions on Circuits and Systems for Video Technology, Aug. 1996, pp. 375-388, vol. 6 No. 4.

Tanaka et al., A New Combination of 1D and 2D Filter Banks for effective Multiresolution Image Representation, ICIP, 2008, pp. 2820-2823, IEEE.

(56) References Cited

OTHER PUBLICATIONS

Tanaka et al., An adaptive extension of combined 2D and 1D directional filter banks, Circuits and Systems, 2009. ISCAS 2009. IEEE International Symposium on, On pp. 2193-2196.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

Wenger et al.; RTP Payload Format for H.264 Video; The Internet Society; 2005.

Wiegand et al, "Overview of the H 264/AVC Video Coding Standard," IEEE Transactions on Circuits and Systems for Video Technology, vol. 13, No. 7, pp. 568, 569, Jul. 1, 2003.

Wiegand, Digital Image Communication: Pyramids and Subbands, 21 pages.

Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.

Wu, Xiaolin, et al., "Calic-A Context based Adaptive :oss;ess Image Codec", 1996 IEEE International Conferece, vol. 4, 4 pages.

Zhi Liu, Zhaoyang Zhang, Liquan Shen, Mosaic Generation in H.264 Compressed Domain, IEEE 2006.

Soon Hie Tan et al., "Classified Perceptual Coding with Adaptive Quantization", IEEE Transactions on Circuits and Systems for Video Technology, IEEE Service Center, Piscataway, NJ, US, vol. 6, No. 4, Aug. 1, 1996.

ISR and the Written Opinion of the International Searching Authority for International Application No. PCT/US2012/055386, mailed Nov. 7, 2012, 17 pages.

* cited by examiner

MOTION ESTIMATION AIDED NOISE REDUCTION

TECHNICAL FIELD

This application relates to video encoding and decoding.

BACKGROUND

Digital video can be used, for example, for remote business meetings via video conferencing, high definition video entertainment, video advertisements, or sharing of user-generated videos. Accordingly, it would be advantageous to provide high resolution video transmitted over communications channels having limited bandwidth.

SUMMARY

A method and apparatus for performing motion estimation aided noise reduction encoding and decoding are provided. Motion estimation aided noise reduction encoding can include identifying a motion vector for encoding a current block in a video frame based on a reference block in a reference frame, identifying a noise reduction block for denoising the current block, aligning the noise reduction block with the current block, denoising the current block, identifying a motion vector for encoding the denoised block, generating a residual block for encoding the denoised block, and encoding the denoised block. Denoising the current block can include identifying a filter coefficient for a pixel in the current block based on a corresponding pixel in the noise reduction block, producing a denoised pixel based on the coefficient and the corresponding pixel, and determining whether to use the denoised pixel or the current pixel for encoding the block.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes including, for example, remote business meetings via video conferencing, high definition video entertainment, video advertisements, and sharing of user-generated videos. Digital video streams can include formats such as VP8, promulgated by Google, Inc. of Mountain View, Calif., and H.264, a standard promulgated by ITU-T Video Coding Experts Group (VCEG) and the ISO/IEC Moving Picture Experts Group (MPEG), including present and future versions thereof.

Video encoding and decoding can include performing motion estimation to generate a motion vector for encoding a block in a current frame based on a corresponding block in a reference frame of a video signal. The video signal can include noise, such as random variations of pixel values. For example, a pixel, such as a background pixel, may include noise, such as a random change in color or brightness when compared to a corresponding pixel in a previous frame. Noise reduction can be performed at the encoder to reduce the noise in the video signal. Motion estimation aided noise reduction can include using the motion vector identified during motion estimation in conjunction with a noise reduction block to efficiently reduce noise in the signal while minimizing blurring and/or artifacting, for example, by replacing a pixel value with an average pixel value. For example, the average pixel value can be generated using a motion compensated noise reduction pixel from the noise reduction block and the pixel value.

A noise reduction block can include pixels used for noise reduction of a block in another frame, such as previous frame in the video sequence. For example, a noise reduction block can be used for denoising a first block in a first frame in the video signal. The noise reduction frame can include information, such as denoised pixel values, from denoising the first block, and can be used for denoising a second block in a second frame in the video signal.

Figure 1:
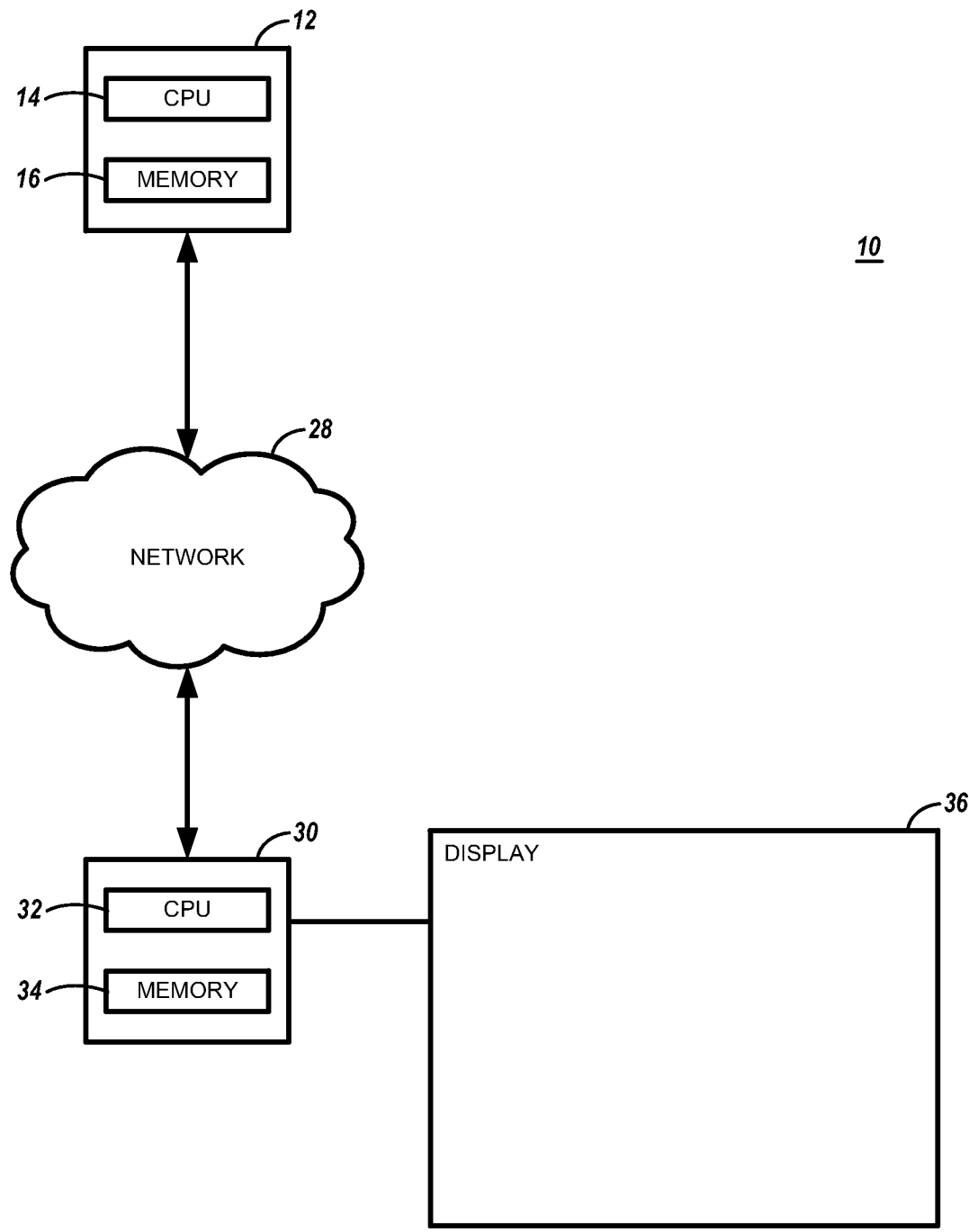
FIG. 1 is a schematic of a video encoding and decoding system.

FIG. 1 is a schematic of a video encoding and decoding system. An exemplary transmitting station 12 can be, for example, a computing device having an internal configuration of hardware including a processor such as a central processing unit (CPU) 14 and a memory 16. The CPU 14 can be a controller for controlling the operations of the transmitting station 12. The CPU 14 is connected to the memory 16 by, for example, a memory bus. The memory 16 can be random access memory (RAM) or any other suitable memory device. The memory 16 can store data and program instructions which are used by the CPU 14. Other suitable implementations of the transmitting station 12 are possible. As used herein, the term "computing device" includes a server, a hand-held device, a laptop computer, a desktop computer, a special purpose computer, a general purpose computer, or any device, or combination of devices, capable of processing information, programmed to perform the methods, or any portion thereof, disclosed herein.

A network 28 can connect the transmitting station 12 and a receiving station 30 for encoding and decoding of the video stream. Specifically, the video stream can be encoded in the transmitting station 12 and the encoded video stream can be decoded in the receiving station 30. The network 28 can, for example, be the Internet. The network 28 can also be a local area network (LAN), wide area network (WAN), virtual private network (VPN), a mobile phone network, or any other means of transferring the video stream from the transmitting station 12.

The receiving station 30, in one example, can be a computing device having an internal configuration of hardware including a processor such as a central processing unit (CPU) 32 and a memory 34. The CPU 32 is a controller for controlling the operations of the receiving station 30. The CPU 32 can be connected to the memory 34 by, for example, a memory bus. The memory 34 can be RAM or any other suitable memory device. The memory 34 stores data and program instructions which are used by the CPU 32. Other suitable implementations of the receiving station 30 are possible.

A display 36 configured to display a video stream can be connected to the receiving station 30. The display 36 can be implemented in various ways, including by a liquid crystal display (LCD) or a cathode-ray tube (CRT). The display 36 can be configured to display a video stream decoded at the receiving station 30.

Other implementations of the encoder and decoder system 10 are possible. For example, one implementation can omit the network 28 and/or the display 36. In another implementation, a video stream can be encoded and then stored for transmission at a later time by the receiving station 30 or any other device having memory. In an implementation, the receiving station 30 receives (e.g., via network 28, a computer bus, and/or some communication pathway) the encoded video stream and stores the video stream for later decoding. In another implementation, additional components can be added to the encoder and decoder system 10. For example, a display or a video camera can be attached to the transmitting station 12 to capture the video stream to be encoded.

Figure 2:
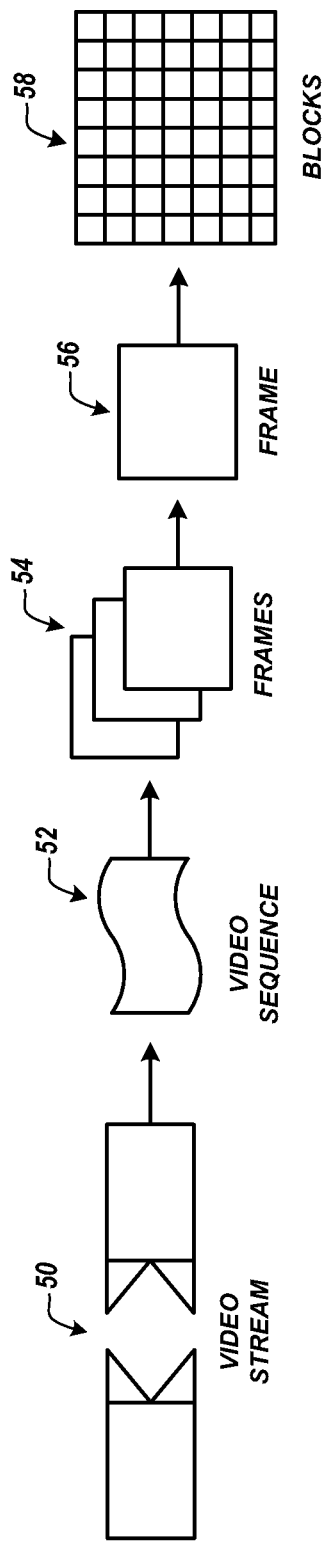
FIG. 2 is a diagram of a typical video stream to be encoded and decoded.

FIG. 2 is a diagram of a typical video stream 50 to be encoded and decoded. The video stream 50 includes a video sequence 52. At the next level, the video sequence 52 includes a number of adjacent frames 54. While three frames are depicted in adjacent frames 54, the video sequence 52 can include any number of adjacent frames. The adjacent frames 54 can then be further subdivided into a single frame 56. At the next level, the single frame 56 can be divided into a series of blocks 58. Although not shown in FIG. 2, a block 58 can include pixels. For example, a block can include a 16×16 group of pixels, an 8×8 group of pixels, an 8×16 group of pixels, or any other group of pixels. Unless otherwise indicated herein, the term 'block' can include a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 3:
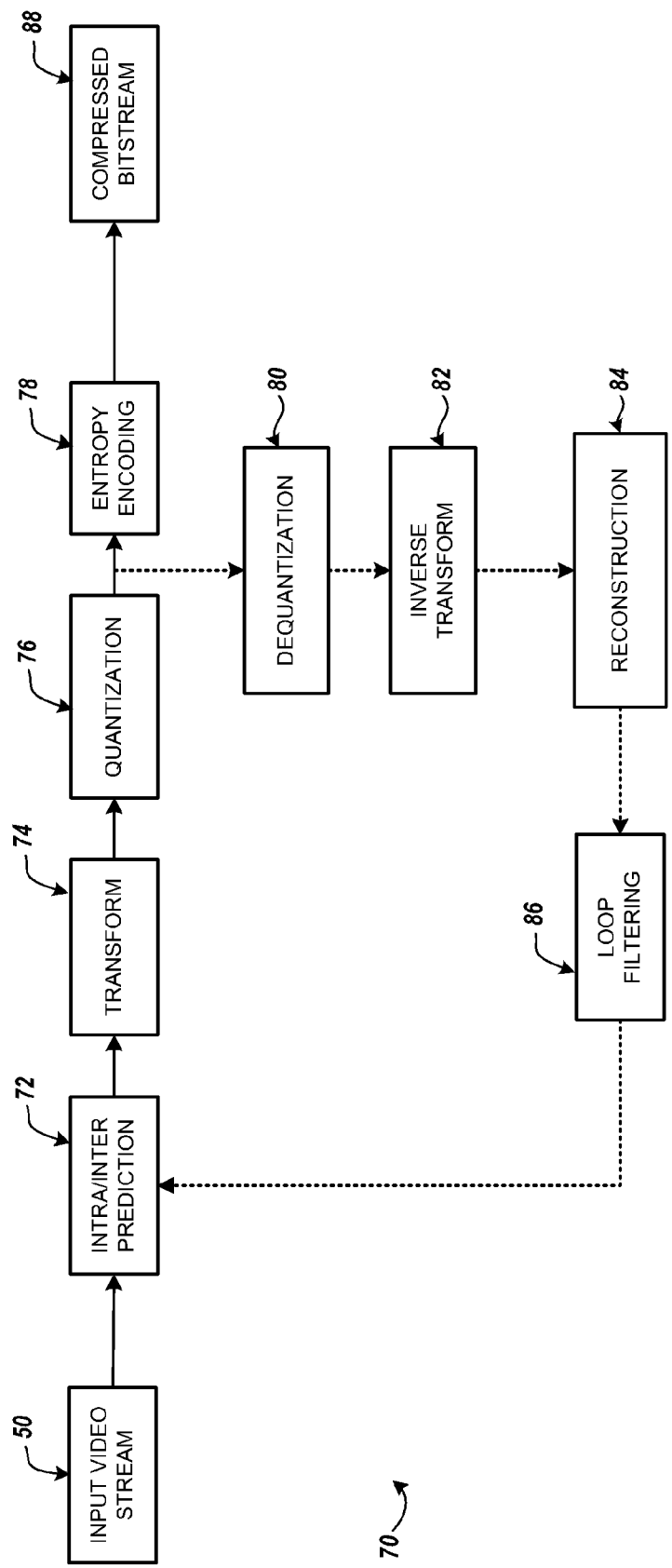
FIG. 3 is a block diagram of a video compression system in accordance with one embodiment.

FIG. 3 is a block diagram of an encoder 70 in accordance with one embodiment. The encoder 70 can be implemented, as described above, in the transmitting station 12 such as by providing a computer software program stored in memory 16, for example. The computer software program can include machine instructions that, when executed by CPU 14, cause transmitting station 12 to encode video data in the manner described in FIG. 3. Encoder 70 can also be implemented as specialized hardware included, for example, in transmitting station 12. Encoder 70 can also be implemented as specialized hardware included, for example, in transmitting station 12. The encoder 70 encodes an input video stream 50. The encoder 70 has the following stages to perform the various functions in a forward path (shown by the solid connection lines) to produce an encoded or a compressed bitstream 88: an intra/inter prediction stage 72, a transform stage 74, a quantization stage 76, and an entropy encoding stage 78. The encoder 70 can also include a reconstruction path (shown by the dotted connection lines) to reconstruct a frame for encoding of further blocks. The encoder 70 has the following stages to perform the various functions in the reconstruction path: a dequantization stage 80, an inverse transform stage 82, a reconstruction stage 84, and a loop filtering stage 86. Other structural variations of the encoder 70 can be used to encode the video stream 50.

When the video stream 50 is presented for encoding, each frame 56 within the video stream 50 is processed in units of blocks. At the intra/inter prediction stage 72, each block can be encoded using either intra-frame prediction, which may be within a single frame, or inter-frame prediction, which may be from frame to frame. In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at the intra/inter prediction stage 72 to produce a residual block. The transform stage 74 transforms the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (i.e. DC) coefficient at the top-left of the matrix and the highest frequency coefficient at the bottom-right of the matrix.

The quantization stage 76 converts the transform coefficients into discrete quantum values, which are referred to as quantized transform coefficients or quantization levels. The quantized transform coefficients are then entropy encoded by the entropy encoding stage 78. Entropy encoding can include using a probability distribution metric. The entropy-encoded coefficients, together with the information used to decode the block, which may include the type of prediction used, motion vectors, and quantizer value, are then output to the compressed bitstream 88. The compressed bitstream 88 can be formatted using various techniques, such as run-length encoding (RLE) and zero-run coding.

The reconstruction path in FIG. 3 (shown by the dotted connection lines) can be used to help provide that both the encoder 70 and a decoder 100 (described below) with the same reference frames to decode the compressed bitstream 88. The reconstruction path performs functions that are similar to functions that take place during the decoding process that are discussed in more detail below, including dequantizing the quantized transform coefficients at the dequantization stage 80 and inverse transforming the dequantized transform coefficients at the inverse transform stage 82 to produce a derivative residual block. At the reconstruction stage 84, the prediction block that was predicted at the intra/inter prediction stage 72 can be added to the derivative residual block to create a reconstructed block. The loop filtering stage 86 can be applied to the reconstructed block to reduce distortion such as blocking artifacts.

Other variations of the encoder 70 can be used to encode the compressed bitstream 88. For example, a non-transform based encoder 70 can quantize the residual block directly without the transform stage 74. In another embodiment, an encoder 70 can have the quantization stage 76 and the dequantization stage 80 combined into a single stage.

Figure 4:
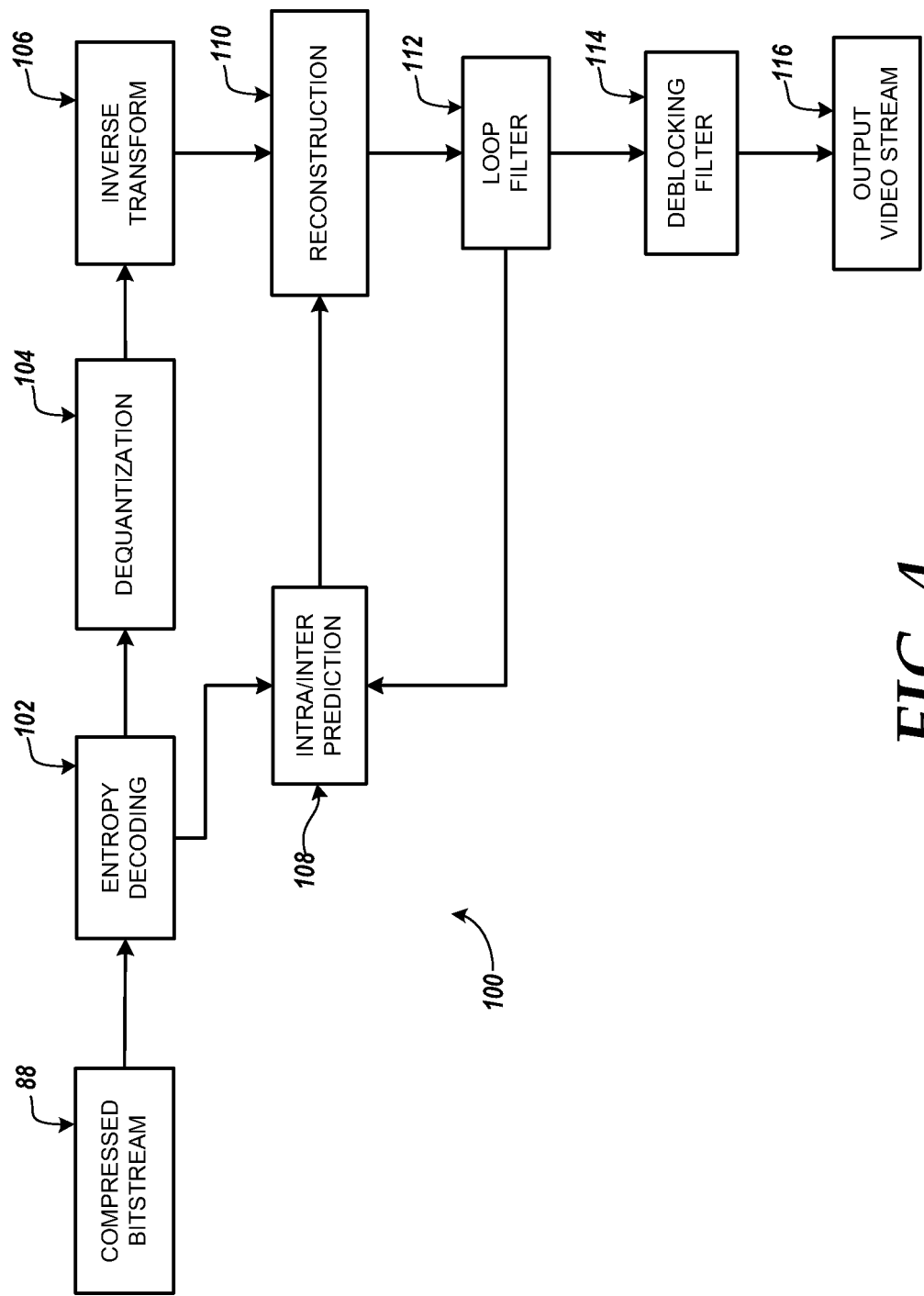
FIG. 4 is a block diagram of a video decompression system in accordance with another embodiment.

FIG. 4 is a block diagram of a decoder 100 in accordance with another embodiment. The decoder 100 can be implemented in a device, such as the receiving station 30 described above, for example, by providing a computer software program stored in memory 34. The computer software program can include machine instructions that, when executed by CPU 32, cause receiving station 30 to decode video data in the manner described in FIG. 4. Decoder 100 can also be implemented as specialized hardware included, for example, in transmitting station 12 or receiving station 30.

The decoder 100, similar to the reconstruction path of the encoder 70 discussed above, includes in one example the following stages to perform various functions to produce an output video stream 116 from the compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of the decoder 100 can be used to decode the compressed bitstream 88.

When the compressed bitstream 88 is presented for decoding, the data elements within the compressed bitstream 88 can be decoded by the entropy decoding stage 102 (using, for example, Context Adaptive Binary Arithmetic Decoding) to produce a set of quantized transform coefficients. The dequantization stage 104 dequantizes the quantized transform coefficients, and the inverse transform stage 106 inverse transforms the dequantized transform coefficients to produce a derivative residual block that can be identical to that created by the inverse transformation stage 84 in the encoder 70. Using header information decoded from the compressed bitstream 88, the decoder 100 can use the intra/inter prediction stage 108 to create the same prediction block as was created in the encoder 70. At the reconstruction stage 110, the prediction block can be added to the derivative residual block to create a reconstructed block. The loop filtering stage 112 can be applied to the reconstructed block to reduce blocking artifacts. The deblocking filtering stage 114 can be applied to the reconstructed block to reduce blocking distortion, and the result is output as the output video stream 116.

Other variations of the decoder 100 can be used to decode the compressed bitstream 88. For example, the decoder 100 can produce the output video stream 116 without the deblocking filtering stage 114.

Figure 5:
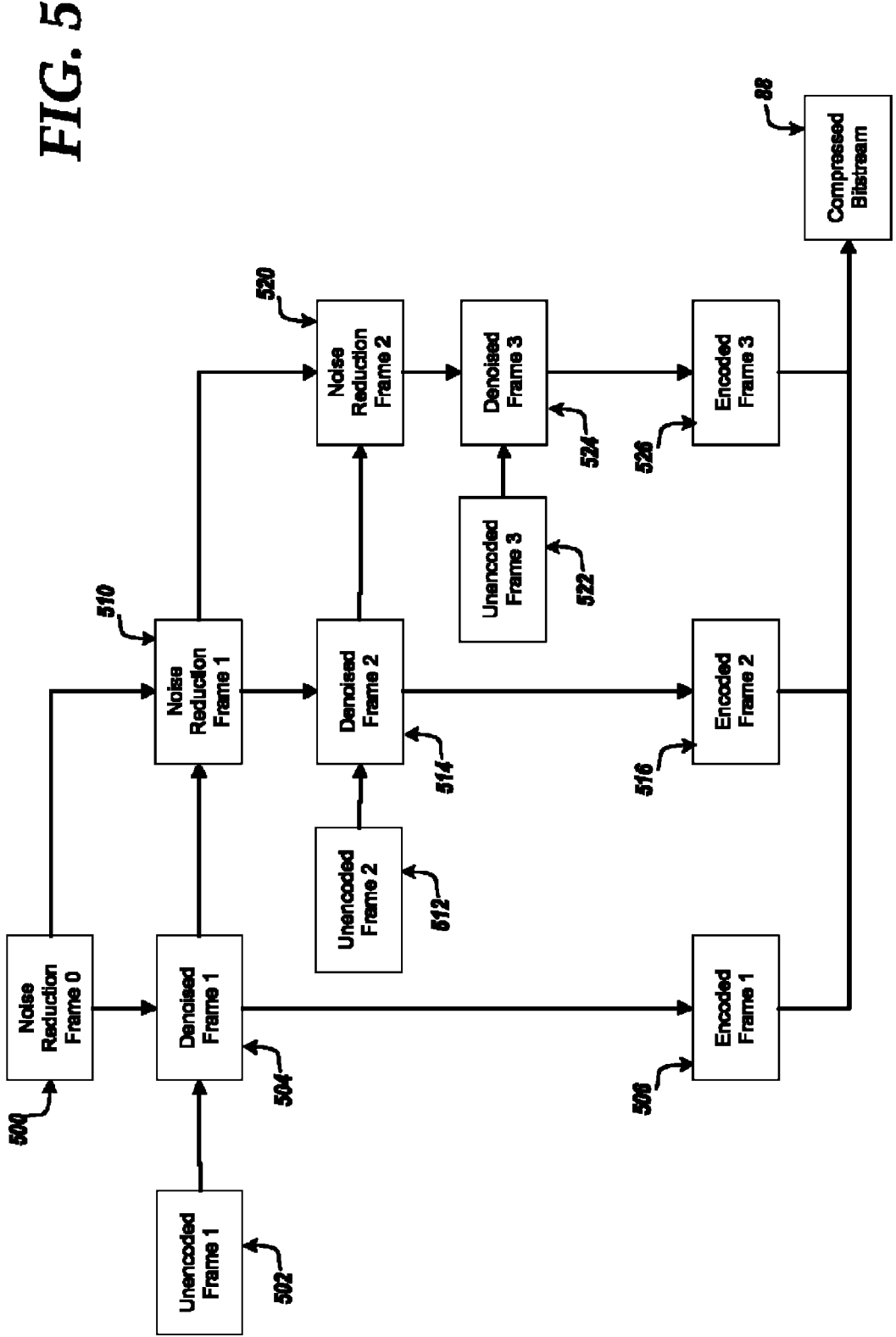
FIG. 5 is a block diagram of motion estimation aided noise reduction encoding for a series of frames in accordance with implementations of this disclosure.

FIG. 5 is a block diagram of motion estimation aided noise reduction encoding for a series of frames in accordance with one embodiment of this disclosure. Implementations of motion estimation aided noise reduction encoding can include using a first noise reduction frame 500, a first unencoded frame 502, or both to generate a first denoised frame 504. In an implementation, generating the first denoised frame 504 can include including a pixel from the first noise reduction frame 500, a pixel from the first unencoded frame 502, a pixel based on a pixel from the first noise reduction frame 500 and a pixel from the first unencoded frame 502, or a combination thereof, in the first denoised frame 504. The first unencoded frame 502 can be a frame from a video sequence, such as the video sequence 52 shown in FIG. 2, for example.

Motion estimation aided noise reduction encoding can include using the first denoised frame 504 to generate a first encoded frame 506. Motion estimation aided noise reduction encoding can include using the first noise reduction frame 500, the first denoised frame 504, or both to generate a second noise reduction frame 510. Generating the second noise reduction frame 510 can include including a pixel from the first noise reduction frame 500, a pixel from the first denoised frame 504, a pixel based on a pixel from the first noise reduction frame 500 and a pixel from the first denoised frame 504, or a combination thereof, in the second noise reduction frame 510.

The second noise reduction frame 510, a second unencoded frame 512, or both can be used to generate a second denoised frame 514. The second unencoded frame 512 can be a second frame in the video sequence. The second denoised frame 514 can be used to generate a second encoded frame 516. The second noise reduction frame 510, the second denoised frame 514, or both can be used to generate a third noise reduction frame 520. The third noise reduction frame 520, a third unencoded frame 522, or both can be used to generate a third denoised frame 524. The third unencoded frame 514 can be a third frame in the video sequence. The third denoised frame 524 can be used to generate a third encoded frame 526. The first encoded frame 506, the second encoded frame 516, the third encoded frame 526, or a combination thereof can be used to generate an encoded video stream, such as the compressed bitstream 88 shown in FIGS. 3 and 5.

Figure 6:
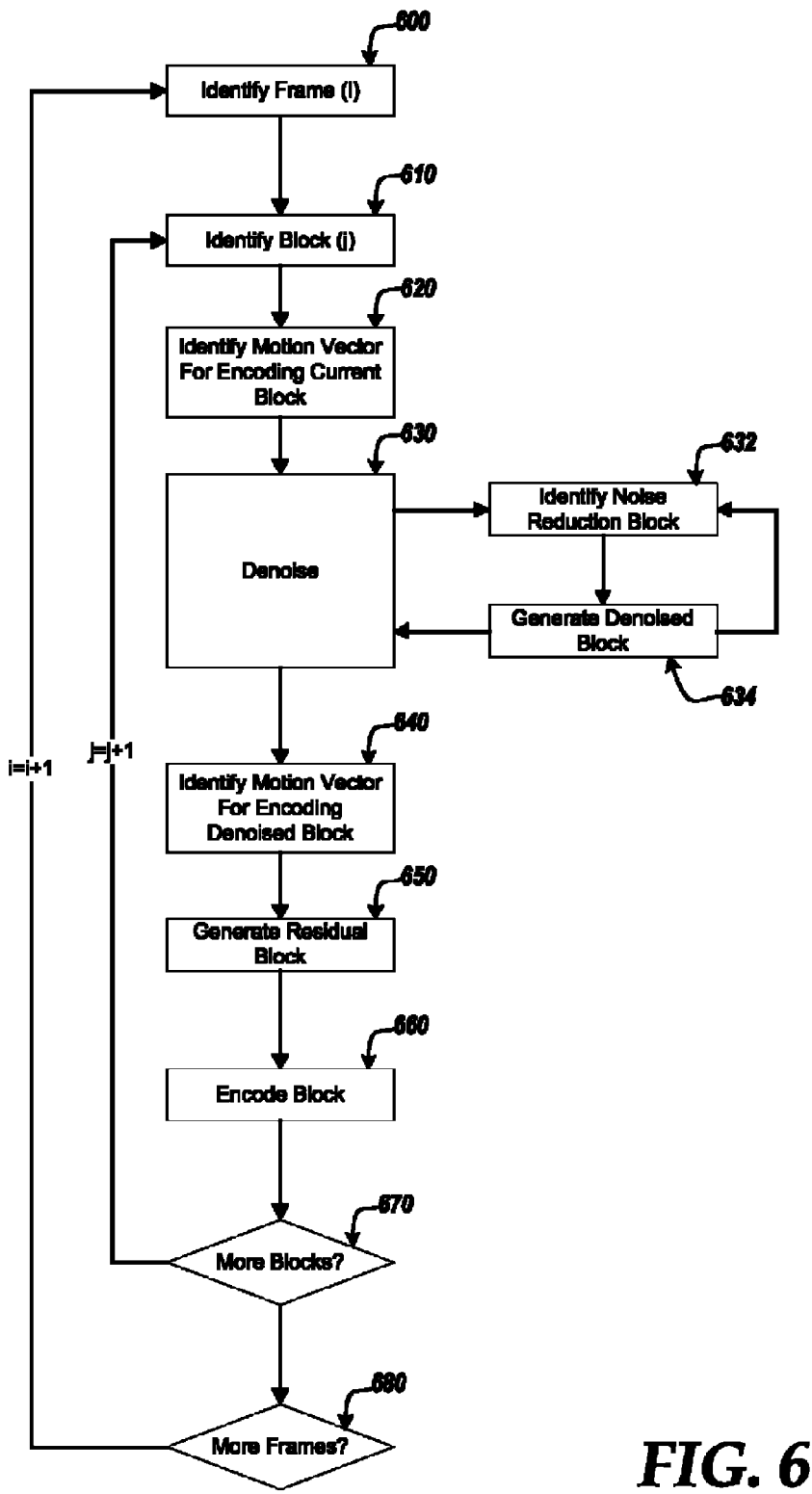
FIG. 6 is a diagram of motion estimation aided noise reduction encoding in accordance with implementations of this disclosure.

FIG. 6 is a diagram of motion estimation aided noise reduction encoding in accordance with one embodiment of this disclosure. Implementations of motion estimation aided noise reduction encoding can include identifying a frame at 600, identifying a current block in the frame at 610, identifying a motion vector for encoding the current block at 620, denoising the block at 630, identifying a motion vector for encoding the denoised block at 640, generating a residual block at 650, generating an encoded block at 660, determining whether to encode another block at 670, determining whether to encode another frame at 680, or a combination thereof. In an implementation, a device, such as the transmitting station 12 shown in FIG. 1, can perform motion estimation aided noise reduction encoding. For example, motion estimation aided noise reduction encoding, or any portion thereof, can be implemented in an encoder, such as the encoder 70 shown in FIG. 3.

As an example, a frame, such as frame 56 shown in FIG. 2, can be identified for encoding at 600. For example, the frame can include an 8×8 matrix of blocks as shown in FIG. 2. Identifying the frame can include identifying a current frame, a reference frame, a noise reduction frame, or a combination thereof.

A block (current block) in the current frame can be identified at 610. For example, the current block can be identified based on Cartesian coordinates. The current block can include pixels. For example, the current block can include a 16×16 matrix of pixels.

A motion vector (MV) for encoding the current block can be identified at 620. For example, the motion vector can be identified based on the current block and a reference block from a reference frame using a method of motion estimation, such as a motion search. Identifying a motion vector can include generating a prediction mode for encoding the current block, generating a sum of squared errors (SSE) for the current block, or both. Identifying the motion vector can include identifying a zero magnitude motion vector ($MV_0$). The zero magnitude motion vector $MV_0$ can indicate a block in the reference frame that is collocated with the current block in the current frame.

The current block can be denoised at 630. Denoising the current block can include identifying a noise reduction block at 632 and generating a denoised block at 634. Identifying the noise reduction block at 632 can include using a noise reduction block from a noise reduction frame (e.g., 500), determining whether a difference between the current block and the reference block is noise, aligning the noise reduction block with the current block, or a combination thereof.

Determining whether a difference between the current block and the reference block is noise can include determining whether the magnitude of the motion vector is less than a threshold ($T_1$), which can indicate noise. On a condition that the magnitude of the motion vector is greater than the threshold $T_1$, the noise reduction block can be aligned with the current block. The motion vector can, for example, include Cartesian coordinates, such as an X coordinate, a Y coordinate, or both, and the magnitude of the motion vector can be a function of the coordinates, such as a square root of the sum of the X coordinate squared and the Y coordinate squared.

The motion vector (MV) identified at 620 can be a non-zero motion vector for the current block that is identified based on noise, such as random variations in pixel values in the current frame, the reference frame, or both. For example, the motion search may determine that a location of the reference block in the reference frame that best matches the current block is slightly different than the location of the current block in the current frame based on noise.

Determining whether a difference between the current block and the reference block is noise can include determining whether the difference between a sum of squared errors (SSE) of the motion vector and an SSE of a zero magnitude motion vector is less than a threshold ($T_2$). The SSEs can be determined based on the sum of squared differences between the pixels of the reference block and the current block.

For example, the current block may include an M×N matrix of pixels, such as a 16×16 matrix of pixels, and a pixel in the current block can be expressed as B(M,N). The reference block indicated by the motion vector may include an M×N matrix of pixels, and a pixel in the reference block can be expressed as RB(M,N). The block in the reference frame indicated by the zero magnitude motion vector $MV_0$ may include an M×N matrix of pixels, and a pixel in the block in the reference frame indicated by the zero magnitude motion vector $MV_0$ can be expressed as $RB_0(M,N)$. The motion vector can indicate a row offset $MV_x$ and a column offset $MV_y$. In an implementation, the SSE associated with the motion vector $SSE_r$ may be expressed as:

$$SSE_r = \Sigma_{x=1,y=1}^{M,N} B(x,y) - RB(x,y).$$ [Equation 1]

The SSE associated with the zero magnitude motion vector $SSE_0$ may be expressed as:

$$SSE_0 = \Sigma_{x=1,y=1}^{M,N} B(x,y) - RB_0(x,y).$$ [Equation 2]

On a condition that the magnitude of the motion vector identified at 620 is less than $T_1$ and the difference between $SSE_r$ and $SSE_0$ is less than $T_2$, the motion vector may be a small motion vector that indicates noise. On a condition that the magnitude of the motion vector is less than $T_1$, or the difference between $SSE_r$ and $SSE_0$ is greater than $T_2$, the noise reduction block may be aligned with the current block.

Figure 7:
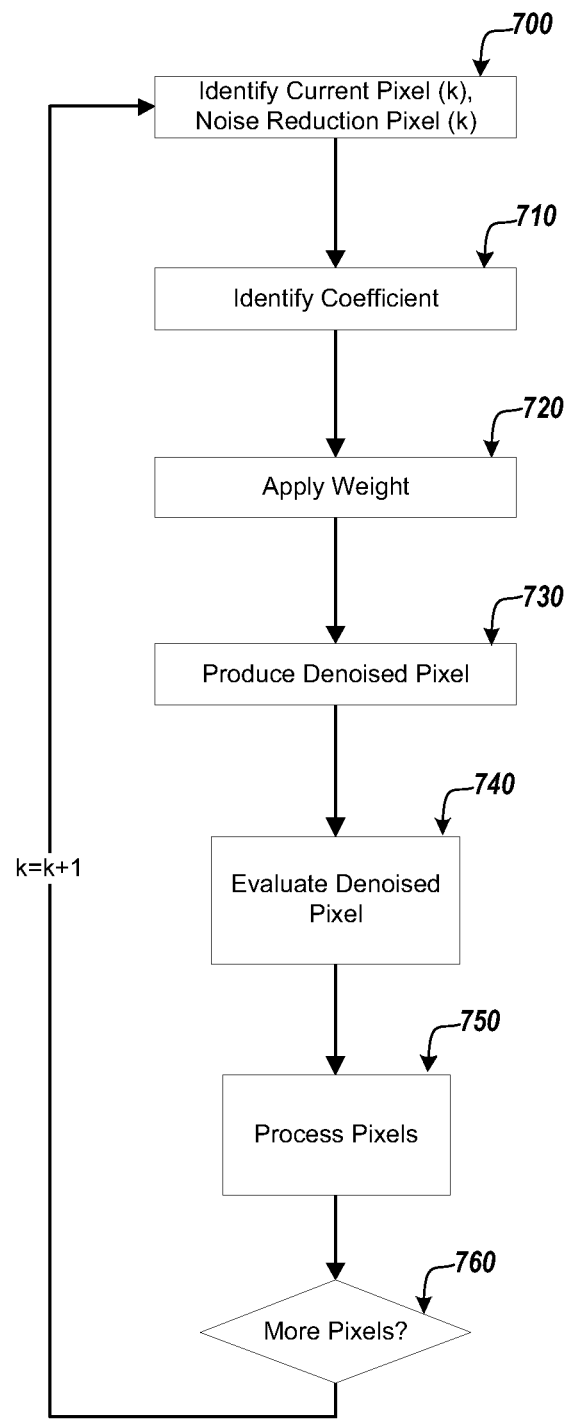
FIG. 7 is a diagram of generating a denoised block in accordance with implementations of this disclosure.

At 634, a denoised block can be generated using the current block and the noise reduction block. For example, a denoised block can be generated as shown in FIG. 7. As shown in FIG. 6, a motion vector for encoding the denoised block can be identified at 640. In an implementation, identifying the motion vector for encoding the denoised block can include using the motion vector identified for encoding the current block at 620 as the motion vector for encoding the denoised block.

In an implementation, identifying the motion vector for encoding the denoised block can include determining whether to use a zero magnitude motion vector to a reference frame for encoding the denoised block. For example, the motion vector identified for encoding the current block may indicate an intra prediction mode and a zero magnitude motion vector to a reference frame can be used for encoding the denoised block. In an implementation, a zero magnitude motion vector to the reference frame may produce a smaller residual than the motion vector identified at 620, and the zero magnitude motion vector can be used for encoding the denoised block. Alternatively, or in addition, identifying the motion vector for encoding the denoised block at 640 can include motion estimation, which can include generating a motion vector for encoding the denoised block based on the denoised block and the reference frame.

A residual block can be generated based on the denoised block at 650, and an encoded block can be generated using the residual block at 660. Whether to encode another block can be determined at 670. For example, unencoded blocks in the current frame can be encoded. Whether to encode another frame can be determined at 680. For example, the noise reduction block can be used to encode another frame, such as a future frame, in the video sequence.

Although not shown in FIG. 6, an encoded video stream, such as the compressed bit stream 88 shown in FIG. 3, can be generated using the encoded block(s) generated at 660. The encoded video stream can be transmitted, stored, further processed, or a combination thereof. For example, the encoded video stream can be stored in a memory, such as the memory 16 and/or 34 shown in FIG. 1. The encoded video stream can also be transmitted to a decoder, such as the decoder 100 shown in FIG. 4.

Other implementations of the diagram of motion estimation aided noise reduction encoding as shown in FIG. 6 are available. In implementations, additional elements of motion estimation aided noise reduction encoding can be added, certain elements can be combined, and/or certain elements can be removed. For example, in an implementation, motion estimation aided noise reduction encoding can include an additional element involving determining whether to denoise a block, and if the determination is not to denoise, the element at 630 of denoising a block can be skipped and/or omitted for one or more blocks and/or frames. Alternatively, or in addition, motion estimation aided noise reduction encoding can include controlling an amount of noise reduction, which can be based on an estimate of the amount of noise, such as an estimate of noise variance or a probability density function.

FIG. 7 is a diagram of generating a denoised block (e.g., at 634) in accordance with one embodiment of this disclosure. Implementations of, generating a denoised block can include identifying pixels at 700, identifying a coefficient at 710, applying a weight (e.g., weighting the coefficient) at 720, producing a denoised pixel at 730, evaluating the denoised pixel at 740, processing the pixels at 750, determining whether to produce another denoised pixel at 760, or a combination thereof.

More specifically, as an example, pixels for generating the denoised block can be identified at 700. Identifying the pixels can include identifying a current pixel ($P_k$) in a current block (e.g., as the block identified at 610) and/or identifying a noise reduction pixel ($NRP_k$) in a noise reduction block (e.g., the noise reduction block identified at 632). Identifying the noise reduction pixel can be based on the current pixel. For example, the location of the current pixel in the current block may correspond with the location of the noise reduction pixel in the noise reduction block.

A coefficient (alpha') can be identified at 710. The coefficient can be identified based on the current pixel and the noise reduction pixel. For example, the coefficient can be identified based on a function of the magnitude of the difference between the current pixel and the noise reduction pixel. In one implementation, the coefficient may be calculated as follows:

$$\text{alpha'} = 1/(1+(|P_k - NRP_k|)/8).$$ [Equation 3]

The coefficient can be weighted at 720. The coefficient can be weighted based on the motion vector. For example, the coefficient can be weighted based on a function of the coefficient and a magnitude of the motion vector (e.g., the motion vector identified at 620). In one implementation, the magnitude of the motion vector and a threshold can be used to indicate whether the current block includes noise. If noise is indicated in the current block, the coefficient can be increased. If noise is not indicated in the current block, the coefficient can be decreased. For example, in one implementation, the weighting can be expressed as:

$$alpha' = (|MV|^2 < 2*T1) \rightarrow alpha' + alpha'/(3 + |MV|^2/10);$$

$$alpha' = (|MV|^2 \geq 8*T1) \rightarrow 0;$$

$$alpha' = [0,1]. \quad \text{[Equation 4]}$$

A denoised pixel $P_k'$ can be produced at 730. The denoised pixel can be produced based on a function of the current pixel $P_k$, the coefficient alpha', the noise reduction pixel $NRP_k$, or a combination thereof. In one implementation, a denoised pixel may be calculated (produced) as follows:

$$P_k' = alpha' * NRP_k + (1 - alpha') * P_k. \quad \text{[Equation 5]}$$

The denoised pixel $P_k'$ can be evaluated at 740. Evaluating the denoised pixel $P_k'$ can include determining whether to include the denoised pixel in the denoised block being generated, determining whether to include the denoised pixel in the noise reduction block being used for generating the denoised block, determining whether to include the current pixel in the denoised block being generated, determining whether to include the current pixel in the noise reduction block being used for generating the denoised block, or a combination thereof. In at least one implementation, the current pixels and/or denoised pixels can be included in a noise reduction block used for generating a next denoised block instead of or in addition to the noise reduction block being used for generating the denoised block.

The evaluation can be based on the denoised pixel and the current pixel. For example, the difference between the current pixel and the denoised pixel can be less than a threshold ($T_3$) and can indicate a small change. In one example, if a small change is indicated, the denoised pixel $P_k'$ can be included in the denoised block being generated and the noise reduction block being used for generating the denoised block. In another example, if a small change is not indicated, the current pixel $P_k$ can be included in the denoised block being generated and the noise reduction block being used for generating the denoised block. Alternatively or additionally, if a small change is not indicated, the current pixel $P_k$ can be included in the denoised block being generated and the denoised pixel $P_k'$ can be included in the noise reduction block being used for generating the denoised block. In an implementation, the noise reduction block used for generating the denoised block can include pixels from the current block, denoised pixels, or both, and can be used for denoising a block in a future frame.

Evaluating the denoised pixel $P_k'$ can also include evaluating the current block. Evaluating the current block can include determining whether the sum of squared errors (SSE) of the motion vector identified at 620 $SSE_r$ is less than a threshold ($T_4$), which can indicate that the current block includes a shift in mean. For example, the $SSE_r$ can be less than or equal to the threshold $T_4$ and the denoised pixel $P_k'$ can be included in the denoised block being generated and the noise reduction block being used for generating the denoised block. In another example, the $SSE_r$ can be greater than the threshold $T_4$ and the current pixel $P_k$ can be included in the denoised block being generated and the noise reduction block being used for generating the denoised block.

Although described separately, evaluating the difference between the current pixel and the denoised pixel, and evaluating the $SSE_r$ can be performed in combination. For example, the difference between the current pixel and the denoised pixel can be less than a threshold ($T_3$) and the $SSE_r$ can be less than the threshold $T_4$, and the denoised pixel $P_k'$ can be included in the denoised block being generated and the noise reduction block being used for generating the denoised block.

The pixels, such as the current pixel, the denoised pixel, the noise reduction pixel, or a combination thereof, can be processed at 750. Processing the pixels can include including the denoised pixel in the denoised block, including the current pixel in the denoised block, including the denoised pixel in the noise reduction block, including the current pixel in the noise reduction block, or a combination thereof. The denoised pixel, the current pixel, or a combination thereof can be included in the denoised block, the noise reduction block, or a combination thereof based on the evaluation above.

For example, in an implementation, the denoised pixel produced at 730 can be included in the denoised block being generated at 634 and the noise reduction block being used to generate the denoised block being generated at 634 on a condition that the evaluation indicates a small difference between the current pixel and the denoised pixel, which can be expressed as $(P_k - P_k')^2 < T_2$, and a small $SSE_r$, which can be expressed as $SSE_r < T_3$. Including the denoised pixel in the noise reduction block can include replacing the noise reduction pixel with the denoised pixel. In an implementation, the difference between the current pixel and the denoised pixel may be greater than a threshold or the $SSE_r$ may be greater than a threshold, and the current pixel can be included in the noise reduction block, the denoised block, or both. In another implementation, the difference between the current pixel and the denoised pixel may be greater than a threshold or the $SSE_r$ may be greater than a threshold, and the denoised pixel can be included in the noise reduction block.

Although described separately for clarity, and while the terms are not used interchangeably, the current block and the denoised block can be the same block. For example, including a denoised pixel in the denoised block can include replacing the current pixel with the denoised pixel in the current block. The noise reduction block can be included in a noise reduction frame (e.g., 510) and can be used for encoding another frame, such as a future frame, in the video sequence.

Other implementations of the diagram of generating a denoised block as shown in FIG. 7 are available. In implementations, additional elements of generating a denoised block can be added, certain elements can be combined, and/or certain elements can be removed. For example, in an implementation, generating a denoised block at 730 can include a combination of evaluating the pixels as shown at 740 and processing the pixels as shown at 750.

Figure 8:
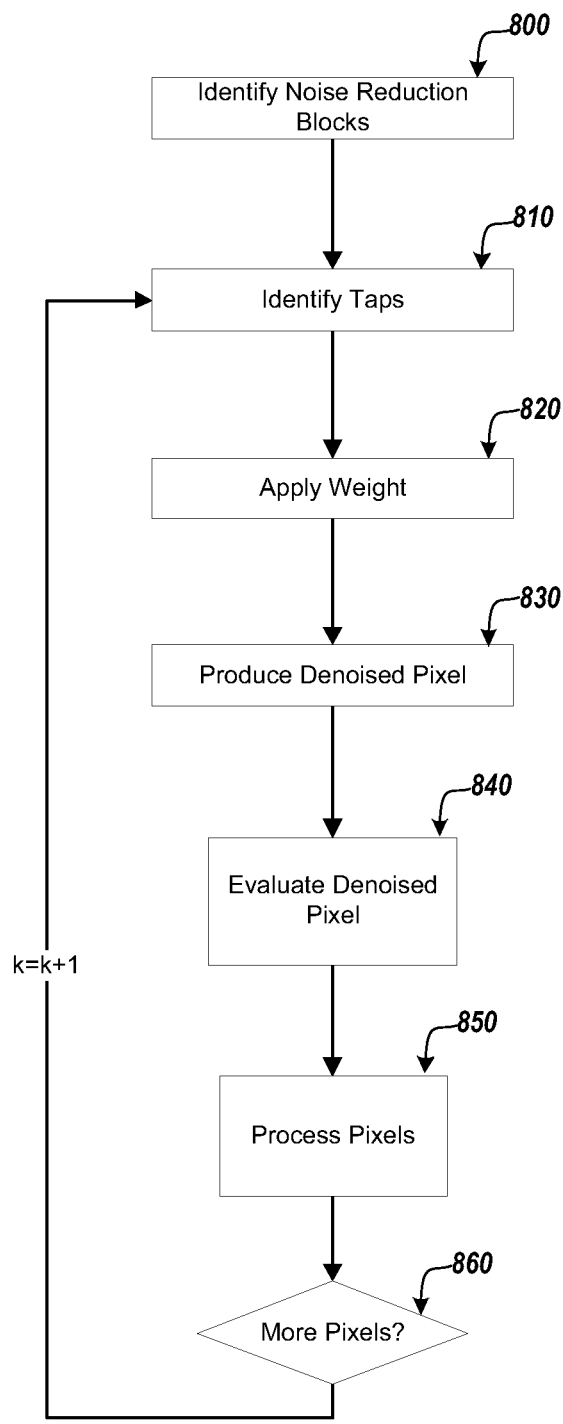
FIG. 8 is a diagram of generating a denoised block using multiple noise reduction blocks in accordance with implementations of this disclosure.

Although FIG. 7 describes an example of denoising using one noise reduction block for simplicity, implementations of this disclosure can include using any number of noise reduction blocks. For example, motion estimation aided noise reduction can include using multiple blocks from N previous frames, which may be denoised frames, as noise reduction blocks. FIG. 8 is a diagram of generating a denoised block using multiple noise reduction blocks in accordance with one embodiment of this disclosure. Motion estimation aided noise reduction can include identifying noise reduction blocks at 800, identifying taps at 810, applying weights (e.g., weighting the taps) at 820, producing a denoised pixel at 830, evaluating the denoised pixel at 840, processing the pixels at 850, determining whether to produce another denoised pixel at 860, or a combination thereof.

More specifically, as an example, noise reduction blocks can be identified at 800. Each noise reduction block ($NRB_{i,j}$) can be associated with a block (j) of a frame (i). For example, a first noise reduction block $NRB_{1,j}$ can be associated with a block from a first frame, which may be a previous frame in the video sequence, and a second noise reduction block $NRB_{2,j}$ can be associated with a block from a second frame, which may be a previous frame in the video sequence. The location of the first noise reduction block in the first frame can correspond with the location of the second noise reduction block in the second frame. The noise reduction blocks can be denoised blocks. The noise reduction blocks can be unencoded blocks. Identifying the noise reduction block can include aligning each of the noise reduction blocks with the current block. Aligning the noise reduction blocks can include finding the noise reduced block which, according to the motion vectors, match the current block. In an implementation, aligning can include adjusting positions of the noise reduction blocks within an noise reduction frame based on the motion vectors. In an implementation, a noise reduction pixel ($NRP_{i,j,k}$) can be a pixel (k) in a noise reduction block (j) in a frame (i).

Taps can be identified at 810. A tap ($TAP_{i,j,k}$) can be associated with a pixel (k) of a block (j) of a frame (i) and can indicate a pixel (k) value weighting metric. For example, a tap $TAP_{0,j,k}$ can be associated with the current block of a current frame and can indicate a metric for weighting the current pixel $P_k$. A tap $TAP_{1,j,k}$ can be associated with the first noise reduction block $NRB_{1,1}$ and can indicate a metric for weighting a noise reduction pixel in the first noise reduction block $NRB_1$. A tap $TAP_{2,j,k}$ can be associated with the second noise reduction block $NRB_2$ and can indicate a metric for weighting a noise reduction pixel in the second noise reduction block.

The taps can be weighted at 820. The taps can indicate equal pixel value weights. For example, the magnitude of the motion vector can be zero and the weighting metrics can be equal. In an implementation, the taps can be weighted based on proximity, such as in cases where the magnitude of the motion vector is greater than zero. For example, a first tap can be associated with a first noise reduction block. The first noise reduction block can be based on a first previous frame, which can precede the current frame in the video sequence. A second tap can be associated with a second noise reduction block. The second noise reduction block can be based on a second previous frame, which can precede the first previous frame in the video sequence. The magnitude of the motion vector can be non-zero and the first tap can weighted more heavily than the second tap.

A denoised pixel $P_k'$ can be produced at 830. Producing the denoised pixel can include identifying a noise reduction pixel $NRP_{i,j,k}$ from each noise reduction block $NRB_{i,j}$ based on the location of the current pixel $P_k$ in the current block of the current frame. Producing a denoised pixel $P_k'$ can include determining a weighted pixel value $NRP_{i,j,k}'$ for each noise reduction pixel $NRP_{i,j,k}$ based on an associated tap, determining a weighted pixel value for the current pixel, and determining a sum of the weighted pixel values. For example, a first tap $TAP_{1,1,k}$ can be associated with the first noise reduction block $NRB_{1,1}$ and can indicate a metric of ¼ for weighting a noise reduction pixel $NRP_{1,1,1}$ in the first noise reduction block. For example, producing a denoised pixel using N taps may be expressed as:

$$P_k' = TAP_{0,1,k} * P_k + \Sigma_{j=1}^{N}(TAP_{i,j,k} * NRP_{i,j,k}). \qquad \text{[Equation 6]}$$

Producing the denoised pixel can include determining the variance among the weighted pixel values. For example, the variance can be the difference between the sum of the weighted pixel values and the mean of the weighted pixel values. Determining the variance may be expressed as:

$$Var(k) = (\Sigma_{j=1}^{N}(NRP_{i,j,k}^2)) - (1/N \Sigma_{j=1}^{N} NRP_{i,j,k})^2. \qquad \text{[Equation 7]}$$

The denoised pixel can be evaluated at 840. The evaluation can be based on the denoised pixel and the current pixel. For example, the difference between the current pixel and the denoised pixel can be less than a threshold and can indicate a small change. The evaluation can include determining whether the variance is less than a threshold. For example, the variance can be less than a threshold and can indicate a small variance.

The pixels can be processed at 850 based on the indication of small change and/or the indication of small variance. Processing the pixels can include including the denoised pixel in the denoised block, including the current pixel in the denoised block, or a combination thereof. For example, the evaluation can indicate a small change and a small variance, and the denoised pixel can be included in the denoised block. Processing the pixels can include including the denoised pixel in a noise reduction block, including the current pixel in a noise reduction block, or a combination thereof. For example, the denoising can include using four noise reducing blocks, (e.g., identified at 800), and the denoised pixel can be included in the first noise reducing block.

Other implementations of the diagram of generating a denoised block using multiple noise reduction blocks as shown in FIG. 8 are available. In implementations, additional elements of generating a denoised block using multiple noise reduction blocks can be added, certain elements can be combined, and/or certain elements can be removed. For example, in an implementation, generating a denoised block using multiple noise reduction blocks can include combining in one element the evaluation of the pixels (as shown at 840) and the processing of the pixels (as shown at 850).

Motion estimation aided noise reduction encoding, or any portion thereof, can be implemented in a device, such as the transmitting station 12 shown in FIG. 1. For example, an encoder, such as the encoder 70 shown in FIG. 3, can implement motion estimation aided noise reduction encoding, or any portion thereof, using instruction stored on a tangible, non-transitory, computer readable media, such as memory 34 shown in FIG. 1.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The embodiments of encoding and decoding described above illustrate some exemplary encoding and decoding techniques. However, it is to be understood that encoding and decoding, as those terms are used in the claims, could mean compression, decompression, transformation, or any other processing or change of data.

The embodiments of the transmitting station 12 and/or the receiving station 30 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 12 and the receiving station 30 do not necessarily have to be implemented in the same manner.

Further, in one embodiment, for example, the transmitting station 12 or the receiving station 30 can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 12 and receiving station 30 can, for example, be implemented on computers in a real-time video system. Alternatively, the transmitting station 12 can be implemented on a server and the receiving station 30 can be implemented on a device separate from the server, such as a hand-held communications device. In this instance, the transmitting station 12 can encode content using an encoder 70 into an encoded video signal and transmit the encoded video signal to the communications device. In turn, the communications device can then decode the encoded video signal using a decoder 100. Alternatively, the communications device can decode content stored locally on the communications device, for example, content that was not transmitted by the transmitting station 12. Other suitable transmitting station 12 and receiving station 30 implementation schemes are available. For example, the receiving station 30 can be a generally stationary personal computer rather than a portable communications device and/or a device including an encoder 70 may also include a decoder 100.

Further, all or a portion of embodiments of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a flame in a video stream, the frame having a plurality of blocks, the method comprising:
   Identifying a noise reduction frame;
   identifying a first motion vector for encoding a current block of the plurality of blocks;
   wherein the first motion vector indicates a reference block in a reference frame, and wherein the noise reduction frame differs from the reference frame;
   identifying a noise reduction block from the noise reduction frame using the first motion vector, such that the noise reduction block is collocated with the reference block;
   generating a denoised block using the current block and the noise reduction block;
   identifying a second motion vector for encoding the denoised block based on the first motion vector;
   generating a residual block using the denoised block and the second motion vector; and
   generating an encoded block based on the residual block and the second motion vector; and
   Wherein the current block includes a plurality of current pixels;
   the noise reduction block includes a plurality of noise reduction pixels; and
   generating the denoised block includes:
      identifying a filter coefficient based on a current pixel from the plurality of current pixels and a noise reduction pixel from the plurality of noise reduction pixels;
      producing a denoised pixel based on the filter coefficient, the current pixel, and the noise reduction pixel;
      on a condition that a difference between the current pixel and the denoised pixel is less than a first threshold and a sum of squared errors value is less than a second threshold, including the denoised pixel in the denoised block;
      on a condition that the difference between the current pixel and the denoised pixel is greater than the first threshold, including the current pixel in the denoised block; and
      on a condition that the difference between the current pixel and the denoised pixel is equal to the first threshold, including the current pixel in the denoised block; and
   wherein generating the denoised block includes weighting the filter coefficient based on a weighting metric, wherein:
      on a condition that a magnitude of the first motion vector is greater than a third threshold and a difference between a sum of squared errors of the first motion vector and a sum of squared errors of a zero magnitude motion vector is greater than a fourth threshold, the weighting metric is zero; and
      on a condition that a magnitude of the first motion vector is less than the third threshold and a difference between a sum of squared errors of the first motion vector and a sum of squared errors of a zero magnitude motion vector is less than the fourth threshold, the weighting metric is the magnitude of the first motion vector.

2. The method of claim 1, wherein identifying the noise reduction block includes using the first motion vector to identify the noise reduction block that corresponds with the current block on a condition that a magnitude of the first motion vector is greater than a first threshold.

3. The method of claim 1, wherein identifying the noise reduction block includes using the first motion vector to identify the noise reduction block that corresponds with the current block on a condition that a difference between a sum of squared errors of the first motion vector and a sum of squared errors of a zero magnitude motion vector is greater than a second threshold.

4. The method of claim 1, wherein:
the current block includes a plurality of current pixels;
the noise reduction block includes a plurality of noise reduction pixels; and
generating the denoised block includes:
identifying a filter coefficient based on a current pixel from the plurality of current pixels and a noise reduction pixel from the plurality of noise reduction pixels,
producing a denoised pixel based on the filter coefficient, the current pixel, the noise reduction pixel, and including the denoised pixel in the denoised block.

5. The method of claim 1, wherein identifying the second motion vector includes using the first motion vector as the second motion vector.

6. The method of claim 1, wherein:
identifying the noise reduction block includes identifying a plurality of noise reduction blocks from a plurality of noise reduction frames that includes the noise reduction frame, wherein a first noise reduction block in the plurality of noise reduction blocks is associated with the reference block and a second noise reduction block in the plurality of noise reduction blocks is associated with another reference block.

7. The method of claim 6, wherein:
the current block includes a plurality of current pixels;
the first noise reduction block includes a first plurality of noise reduction pixels;
the second noise reduction block includes a second plurality of noise reduction pixels; and
generating the denoised block includes:
identifying a first filter coefficient based on a current pixel from the plurality of current pixels;
identifying a first noise reduction pixel from the first plurality of noise reduction pixels;
identifying a second noise reduction pixel from the second plurality of noise reduction pixels;
producing a denoised pixel based on the filter coefficient, the current pixel, the first noise reduction pixel, and the second noise reduction pixel; and
including the denoised pixel in the denoised block.

8. The method of claim 7, wherein:
generating the denoised block includes generating a variance based on the first noise reduction pixel and the second noise reduction pixel; and
including the denoised pixel includes using the current pixel as the denoised pixel on a condition that the a difference between the current pixel and the denoised pixel is greater than a first threshold and the variance is greater than a second threshold.

9. An apparatus for encoding a frame in a video stream, the flame having a plurality of blocks, the apparatus comprising:
a memory; and
a processor configured to execute instructions stored in the memory to:
identifying a noise reduction frame;
identify a first motion vector for encoding a current block of the plurality of blocks, wherein the first motion vector indicates a reference block in a reference frame, and wherein the noise reduction frame differs from the reference frame;
identify a noise reduction block from the noise reduction frame such that the noise reduction block is collocated with the reference block;
generate a denoised block using the current block and the noise reduction block;
identify a second motion vector for encoding the denoised block based on the first motion vector;
generate a residual block using the denoised block and the second motion vector; and
generate an encoded block based on the residual block and the second motion vector; and
wherein the current block includes a plurality of current pixels;
the noise reduction block includes a plurality of noise reduction pixels; and
the processor is configured to generate the denoised block by:
identifying a filter coefficient based on a current pixel from the plurality of current pixels and a noise reduction pixel from the plurality of noise reduction pixels;
producing a denoised pixel based on the filter coefficient, the current pixel, and the noise reduction pixel;
on a condition that a difference between the current pixel and the denoised pixel is less than a first threshold and a sum of squared errors value is less than a second threshold, including the denoised pixel in the denoised block;
on a condition that the difference between the current pixel and the denoised pixel is greater than the first threshold, including the current pixel in the denoised block; and
on a condition that the difference between the current pixel and the denoised pixel is equal to the first threshold, including the current pixel in the denoised block; and
wherein the processor is configured to generate the denoised block by weighting the filter coefficient based on a weighting metric, wherein:
on a condition that a magnitude of the first motion vector is greater than a third threshold and a difference between a sum of squared errors of the first motion vector and a sum of squared errors of a zero magnitude motion vector is greater than a fourth threshold, the weighting metric is zero; and
on a condition that a magnitude of the first motion vector is less than the third threshold and a difference between a sum of squared errors of the first motion vector and a sum of squared errors of a zero magnitude motion vector is less than the fourth threshold, the weighting metric is the magnitude of the first motion vector.

10. The apparatus of claim 9, wherein the processor is configured to identify the noise reduction block by using the first motion vector to identify the noise reduction block that corresponds with the current block on a condition a magnitude of the first motion vector is less than a first threshold.

11. The apparatus of claim 9, wherein the processor is configured to identify the noise reduction block by using the first motion vector to identify the noise reduction block that corresponds with the current block on a condition that a difference between a sum of squared errors of the first motion vector and a sum of squared errors of a zero magnitude motion vector is greater than a second threshold.

12. The apparatus of claim 9, wherein:
the current block includes a plurality of current pixels;
the noise reduction block includes a plurality of noise reduction pixels; and
the processor is configured to generate the denoised block by:
identifying a filter coefficient based on a current pixel from the plurality of current pixels and a noise reduction pixel from the plurality of noise reduction pixels;
producing a denoised pixel based on the filter coefficient, the current pixel, and the noise reduction pixel; and
including the denoised pixel in the denoised block.

13. The apparatus of claim 9, wherein the processor is configured to execute instructions stored in the memory to:
determine whether an intra prediction mode is indicated by the first motion vector; and
identify a zero magnitude motion vector as the second motion vector if the intra prediction mode is indicated.

14. The apparatus of claim 9, wherein the processor is configured to identify the noise reduction block by identifying a plurality of noise reduction blocks from a plurality of noise reduction frames that includes the noise reduction frame, wherein a first noise reduction block in the plurality of noise reduction blocks is associated with the reference block and a second noise reduction block in the plurality of noise reduction blocks is associated with another reference block.

15. The method of claim 1, wherein the current block includes a plurality of current pixels, the noise reduction block includes a plurality of noise reduction pixels, and wherein generating the denoised block includes producing a denoised pixel based on a current pixel from the plurality of current pixels, and a noise reduction pixel from the plurality of noise reduction pixels, the method further comprising:
on a condition that a difference between the current pixel and the denoised pixel is within an identified threshold, including the denoised pixel in the noise reduction block; and
on a condition that a difference between the current pixel and the denoised pixel exceeds the identified threshold, including the current pixel in the noise reduction block.

16. The method of claim 1, wherein the frame is a first frame from a sequence of frames from the video stream, and wherein generating the denoised block includes generating an updated noise reduction block based on the noise reduction block and the current block, the method further comprising:
identifying a second frame from the sequence of frames, wherein the first frame precedes the second frame in the sequence of frames; and
generating a second denoised block using a block from the second frame and the updated noise reduction block.

* * * * *